US012592176B2

(12) United States Patent
Lee et al.

(10) Patent No.: US 12,592,176 B2
(45) Date of Patent: Mar. 31, 2026

(54) ELECTRONIC APPARATUS AND CONTROL METHOD THEREOF FOR PROVIDING A PROGRESSIVE OR INTERLACED SCANNING METHOD

(71) Applicant: SAMSUNG ELECTRONICS CO., LTD., Suwon-si (KR)

(72) Inventors: Jaehyang Lee, Suwon-si (KR); Kwangbok Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 539 days.

(21) Appl. No.: 17/865,082

(22) Filed: Jul. 14, 2022

(65) Prior Publication Data

US 2022/0351669 A1 Nov. 3, 2022

Related U.S. Application Data

(63) Continuation of application No. PCT/KR2022/006136, filed on Apr. 29, 2022.

(30) Foreign Application Priority Data

May 3, 2021 (KR) ........................ 10-2021-0057432

(51) Int. Cl.
*G09G 3/20* (2006.01)
*G09G 3/32* (2016.01)

(52) U.S. Cl.
CPC ............ *G09G 3/2096* (2013.01); *G09G 3/32* (2013.01); *G09G 2300/06* (2013.01); (Continued)

(58) Field of Classification Search
CPC .... G09G 3/2096; G09G 3/32; G09G 2300/06; G09G 2310/066; G09G 2320/0233; G09G 2330/021; G09G 2300/026
See application file for complete search history.

(56) References Cited

U.S. PATENT DOCUMENTS 8,212,845 B2 7/2012 Lee et al.
9,659,518 B2 5/2017 Koh et al.
(Continued)

FOREIGN PATENT DOCUMENTS

EP 1 901 267 A2 3/2008
JP 2010-32915 A 2/2010
(Continued)

OTHER PUBLICATIONS

Communication dated Jul. 3, 2024, issued by the Korean Intellectual Property Office in Korean Patent Application No. 10-2021-0057432.

(Continued)

*Primary Examiner* — Benjamin C Lee
*Assistant Examiner* — Nathan P Brittingham
(74) *Attorney, Agent, or Firm* — Sughrue Mion, PLLC

(57) ABSTRACT

An electronic apparatus is disclosed. The electronic apparatus includes a display including a plurality of scan lines arranged in one direction, a plurality of data lines arranged in a direction perpendicular to the plurality of scan lines, a pixel generated in an intersection area of the scan lines and the data lines, and one or more processors configured to provide the scan signal to the plurality of scan lines in an interlaced scanning method based on the image frame being an image in which a first pixel line having high-luminance greater than or equal to a threshold luminance and a second pixel line having low-luminance less than the threshold luminance are alternately arranged.

15 Claims, 12 Drawing Sheets

(52) U.S. Cl.
CPC ................. *G09G 2310/066* (2013.01); *G09G 2320/0233* (2013.01); *G09G 2330/021* (2013.01)

(56) References Cited

U.S. PATENT DOCUMENTS

| | | | |
|---|---|---|---|
| 9,824,653 | B2 | 11/2017 | Park et al. |
| 2004/0017518 | A1* | 1/2004 | Stern ..................... G06F 21/305 348/789 |
| 2005/0212731 | A1* | 9/2005 | Kawashima ......... G09G 3/3216 345/76 |
| 2007/0075956 | A1 | 4/2007 | Satou et al. |
| 2007/0222733 | A1 | 9/2007 | Ju et al. |
| 2010/0289828 | A1 | 11/2010 | Lee et al. |
| 2012/0256885 | A1 | 10/2012 | Kwon et al. |
| 2015/0116379 | A1* | 4/2015 | Lim ....................... G09G 3/342 345/691 |
| 2015/0194110 | A1 | 7/2015 | Park et al. |
| 2016/0055784 | A1 | 2/2016 | Koh et al. |
| 2016/0267868 | A1 | 9/2016 | Choi |
| 2016/0358582 | A1* | 12/2016 | Lee ....................... G06F 3/1446 |
| 2018/0012533 | A1* | 1/2018 | Lee ...................... G09G 3/2092 |
| 2018/0190188 | A1 | 7/2018 | Ng et al. |
| 2020/0105180 | A1* | 4/2020 | Wang ................... G09G 3/3677 |
| 2020/0111439 | A1 | 4/2020 | Kim et al. |

FOREIGN PATENT DOCUMENTS

| | | | |
|---|---|---|---|
| KR | 10-0911006 | B1 | 8/2009 |
| KR | 10-2010-0122841 | A | 11/2010 |
| KR | 101053845 | B1 | 8/2011 |
| KR | 1020120096777 | A | 8/2012 |
| KR | 10-2015-0004710 | A | 1/2015 |
| KR | 1020150082774 | A | 7/2015 |
| KR | 10-2016-0023023 | A | 3/2016 |
| KR | 1020170111468 | A | 10/2017 |
| KR | 10-1795744 | B1 | 11/2017 |
| KR | 10-2020-0039890 | A | 4/2020 |

OTHER PUBLICATIONS

Communication dated Jul. 4, 2024, issued by the European Patent Office in counterpart European Application No. 22799057.9.

Search Report issued Aug. 10, 2022 by the International Searching Authority in International Application No. PCT/KR2022/006136.

Written Opinion issued Aug. 10, 2022 by the International Searching Authority in International Application No. PCT/KR2022/006136.

Communication issued Aug. 8, 2025 by the Vietnamese Patent Office in Vietnamese Patent Application No. 1-2023-05348.

* cited by examiner

<POWER CURRENT WAVEFORM>

<INTERLACED SCANNING NOISE INDUCING PATTERN >

<HEADLINE LIST PATTERN>

ELECTRONIC APPARATUS AND CONTROL METHOD THEREOF FOR PROVIDING A PROGRESSIVE OR INTERLACED SCANNING METHOD

CROSS-REFERENCE TO RELATED APPLICATION

This application is a bypass continuation of International Application No. PCT/KR2022/006136, filed on Apr. 29, 2022, which is based on and claims priority to Korean Patent Application No. 10-2021-0057432, filed on May 3, 2021, the disclosures of which are incorporated by reference herein in their entireties.

TECHNICAL FIELD

The disclosure relates to an electronic apparatus and a control method thereof. More particularly, the disclosure relates to an electronic apparatus including a display driven by a passive matrix (PM) and a control method thereof.

BACKGROUND ART

In a related art passive matrix (PM) driven display device, when an image frame is provided, a power supply of the display device has a structure that is affected by an operation of a driver IC.

For example, when the driver IC is in an operational state, and a load of the driver IC uses power, a current level increases. Specifically, when a plurality of pixels in a same scan line are in an operational state simultaneously in a display device driven by the PM, and a plurality of pixels are in an operational state across several scan lines, the current level increases to the maximum.

In this case, when the scan lines are repeatedly turned on/off while having a pattern, the current level forms a waveform having a constant frequency.

Here, when the frequency of the formed waveform is within an audible frequency or has a large amplitude, there is a problem in that acoustic noise is provided to the user.

For instance, even when an image without sound is provided in a place such as a conference room, a lobby, or the like, when the acoustic noise is provided to the user, a problem such as a feeling of discomfort to the user may occur. Accordingly, when the acoustic noise is unintentionally generated, there have been various demands with respect to an apparatus and method for preventing it.

DISCLOSURE

Technical Problem

The disclosure has been made in accordance with the necessity described above, and an object of the disclosure is to provide an electronic apparatus for preventing generation of acoustic noise while providing an image, and a method for controlling thereof.

Technical Solution

According to an aspect of the disclosure, there is provided an electronic apparatus including: a display including a plurality of scan lines arranged in a first direction, a plurality of data lines arranged in a second direction perpendicular to the first direction, and a plurality of pixels, each of the plurality of pixels being located an intersection of one of the plurality of scan lines and one of the plurality of data lines; and one or more processors configured to provide a scan signal to the plurality of scan lines based on a progressive scanning method during a time period corresponding to an image frame, and provide an image signal corresponding to the image frame to a data line corresponding to a scan line, among the plurality of scan lines, to which the scan signal is provided, wherein the one or more processors is further configured to, based on the image frame including a first pixel line having a first luminance greater than or equal to a reference luminance and a second pixel line having a second luminance less than the reference luminance are alternately arranged, provide the scan signal to the plurality of scan lines in an interlaced scanning method, and wherein the first pixel line and the second pixel line are in a same direction as the scan line.

The one or more processors may be further configured to, based on the first pixel line including a plurality of continuously arranged pixel lines having the first luminance are and the second pixel line having a plurality of continuously arranged pixel lines having the second luminance, apply the scan signal to at least one of the scan lines corresponding to the first pixel line and apply the scan signal to at least one of the scan lines corresponding the second pixel line.

The one or more processors may be configured to determine a number of scan lines to which the scan signal is continuously applied among the scan lines corresponding to the first pixel line based on a number of scan lines corresponding to the first pixel line and a number of scan lines corresponding to the second pixel line.

The one or more processors may be configured to determine a separation distance between scan lines to which the scan signal is continuously applied in the interlaced scanning method based on a number of scan lines corresponding to the first pixel line and a number of scan lines corresponding to the second pixel line.

The one or more processors may be configured to provide the scan signal in the interlaced scanning method to provide a current having a waveform, in which, an amplitude is less than a reference amplitude or a frequency is greater than a reference frequency to the display.

The image frame may be configured to include a stripe pattern in which the first pixel line having the first luminance and the second pixel line having the second luminance are alternately arranged.

The one or more processors may be configured to identify a pixel line in a same direction as the scan line and having an average luminance of pixels greater than or equal to the reference luminance as the first pixel line, and identify a pixel line in a same direction as the scan line and having an average luminance of pixels less than the reference luminance as the second pixel line.

The display may be configured to be composed of a plurality of display modules, and each of the plurality of display modules may be configured to include the plurality of scan lines arranged in the first direction, the plurality of data lines arranged in the second direction, and the pixel provided at each intersection area of the plurality of scan lines and the plurality of data lines, wherein the one or more processors may be configured to, based on the image frame including the first pixel line having the first luminance greater than or equal to the reference luminance and the second pixel line having the second luminance less than the reference luminance are alternately arranged, provide the scan signal to the plurality of scan lines included in each of the plurality of display modules in the interlaced scanning method.

The pixel may be a light emitting diode (LED) pixel.

According to another aspect of the disclosure, there is provided a method of controlling an electronic apparatus including: a plurality of scan lines arranged in a first direction, a plurality of data lines arranged in a second direction perpendicular to the first direction, and a plurality of pixels, each of the plurality of pixels being located an intersection of one of the plurality of scan lines and one of the plurality of data lines, the method including: providing a scan signal to the plurality of scan lines based on a progressive scanning method during a time period corresponding to an image frame; and providing an image signal corresponding to the image frame to a data line corresponding to a scan line, among the plurality of scan lines, to which the scan signal is provided, wherein the providing the scan signal further includes, based on the image frame including a first pixel line having a first luminance greater than or equal to a reference luminance and a second pixel line having a second luminance less than the reference luminance are alternately arranged, providing the scan signal to the plurality of scan lines in an interlaced scanning method, and wherein the first pixel line and the second pixel line are in a same direction as the scan line.

The providing the scan signal in the interlaced scanning method includes, based on the first pixel line including a plurality of continuously arranged pixel lines having the first luminance are and the second pixel line having a plurality of continuously arranged pixel lines having the second luminance, applying the scan signal to at least one of the scan lines corresponding to the first pixel line and applying the scan signal to at least one of the scan lines corresponding the second pixel line.

The method may further include determining a number of scan lines to which the scan signal is continuously applied among the scan lines corresponding to the first pixel line based on a number of scan lines corresponding to the first pixel line and a number of scan lines corresponding to the second pixel line.

The method may further include determining a separation distance between scan lines to which the scan signal is continuously applied in the interlaced scanning method based on a number of scan lines corresponding to the first pixel line and a number of scan lines corresponding to the second pixel line.

The method may further include providing the scan signal in the interlaced scanning method to provide a current having a waveform, in which, an amplitude is less than a reference amplitude or a frequency is greater than a reference frequency to the display.

The image frame may be configured to include a stripe pattern in which the first pixel line having the first luminance and the second pixel line having the second luminance are alternately arranged.

According to an aspect of the disclosure, there is provided an electronic apparatus including: a display including a plurality of scan lines arranged in a first direction, a plurality of data lines arranged in a second direction perpendicular to the first direction, and a plurality of pixels, each of the plurality of pixels being located an intersection of one of the plurality of scan lines and one of the plurality of data lines; and a one or more processors configured to: determine whether an image frame to be displayed by the display include a pattern satisfying a first criteria; control the display to output the image frame according to an interlaced scanning method based on a determination that the pattern of the image frame satisfies the first criteria; and control the display to output the image frame according to an progressive scanning method based on a determination that the pattern of the image frame does not satisfy the first criteria.

The first criteria indicates that the pattern of the image frame generates audible noise.

The first criteria indicates that the pattern of the image frame causes the electronic apparatus to output a current having of a waveform, in which an amplitude is greater than a reference amplitude or a frequency is within a reference frequency range.

Effect of the Invention

According to various example embodiments of the disclosure, generation of acoustic noise may be prevented while an image including a specific pattern is output in a PM driven display device.

According to various example embodiments, an occurrence of acoustic noise in the electronic apparatus may be prevented by using a software (SW) algorithm instead of provide a separate hardware (HW) component.

BEST MODE FOR IMPLEMENTING THE DISCLOSURE

Figure 1:
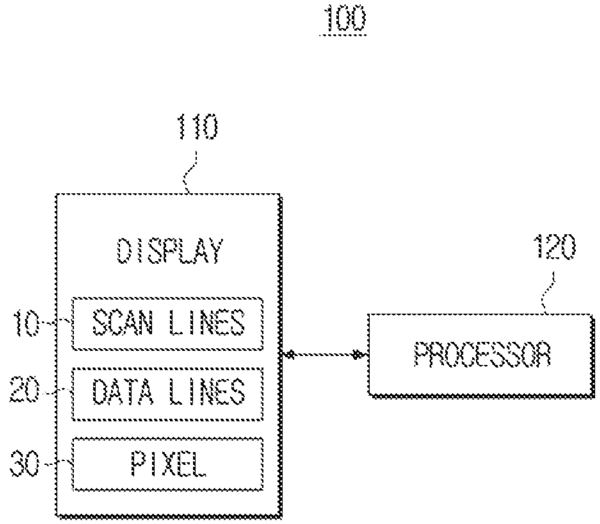
FIG. 1 is a block diagram illustrating a configuration of an electronic apparatus according to an example embodiment.

The terms used in example embodiments will be briefly explained, and example embodiments will be described in greater detail with reference to the accompanying drawings.

Terms used in the disclosure are selected as general terminologies currently widely used in consideration of the configuration and functions of the disclosure, but can be different depending on intention of those skilled in the art, a precedent, appearance of new technologies, and the like. Further, in specific cases, terms may be arbitrarily selected. In this case, the meaning of the terms will be described in the description of the corresponding example embodiments. Accordingly, the terms used in the description should not necessarily be construed as simple names of the terms, but be defined based on meanings of the terms and overall contents of the disclosure.

The example embodiments may vary, and may be provided in different example embodiments. Various example embodiments will be described with reference to accompanying drawings. However, this does not necessarily limit the scope of the exemplary example embodiments to a specific example embodiment form. Instead, modifications, equivalents and replacements included in the disclosed concept and technical scope of this specification may be employed. While describing exemplary example embodiments, if it is determined that the specific description regarding a known technology obscures the gist of the disclosure, the specific description is omitted.

The terms such as "first," "second," and so on may be used to describe a variety of elements, but the elements should not be limited by these terms. The terms used herein are solely intended to explain specific example embodiments, and not to limit the scope of the disclosure.

Singular forms are intended to include plural forms unless the context clearly indicates otherwise. The terms "include", "comprise", "is configured to," etc., of the description are used to indicate that there are features, numbers, steps, operations, elements, parts or combination thereof, and they should not exclude the possibilities of combination or addition of one or more features, numbers, steps, operations, elements, parts or a combination thereof.

In the disclosure, a 'module' or a 'unit' performs at least one function or operation and may be implemented by hardware or software or a combination of the hardware and the software. In addition, a plurality of 'modules' or a plurality of 'units' may be integrated into at least one module and may be at least one processor except for 'modules' or 'units' that should be realized in a specific hardware.

The example embodiments of the disclosure will be described in greater detail below in a manner that will be understood by one of ordinary skill in the art. However, exemplary example embodiments may be realized in a variety of different configurations, and not limited to descriptions provided herein. Also, well-known functions or constructions are not described in detail since they would obscure the invention with unnecessary detail.

FIG. 1 is a block diagram illustrating a configuration of an electronic apparatus according to an example embodiment.

Referring to FIG. 1, the electronic apparatus 100 includes a display 110 and one or more processors 120. The electronic apparatus 100 may provide various types of content through the display 110.

Here, the electronic apparatus 100 may include at least one of a smartphone, a tablet PC, a mobile phone, a video phone, an e-book reader, a desktop PC, a laptop PC, a netbook computer, a workstation, a server, a PDA, a portable multimedia player (PMP), an MP3 player, a medical device, a camera, a virtual reality (VR) realization device, or a wearable device. A wearable device may include at least one of an accessory type (e.g.: watch, ring, bracelet, ankle bracelet, necklace, glasses, contact lens, or head-mounted-device (HMD)), fabric or cloth-embedded type (e.g.: e-cloth), body-attached type (e.g.: skin pad or tattoo), or bioimplant circuit. In some exemplary example embodiments, an electronic apparatus may include, for example, at least one of television, digital video disk (DVD) player, audio, refrigerator, air-conditioner, cleaner, oven, microwave, washing machine, air cleaner, set top box, home automation control panel, security control panel, media box (ex: Samsung HomeSyncM, Apple TV™, or Google TV™), game console (ex: Xbox™, PlayStation™), e-dictionary, e-key, camcorder, or e-frame.

In another exemplary example embodiment, an electronic apparatus 100 may include various medical devices, magnetic resonance angiography (MRA), magnetic resonance imaging (MRI), computed tomography (CT), photographing device, or ultrasonic device, etc.), navigator, global navigation satellite system (GNSS), event data recorder (EDR), flight data recorder (FDR), vehicle info-tainment device, e-device for ships, avionics, security device, head unit for vehicles, industrial or home-use robots, drone, ATM of financial institutions, point of sales (POS) of shops, or internet of things device. The various medical devices may include various portable medical measuring devices such as a blood glucose monitor, a heart rate monitor, a blood pressure measuring device, or a body temperature measuring device, etc. The e-device for ships may include a navigation device for ship, a gyrocompass, etc. The internet of things device may include a light bulb, sensors, a sprinkler, a fire alarm, a temperature controller, a streetlight, a toaster, sporting goods, a hot water tank, a heater, a boiler, etc.

The electronic apparatus 100 according to an example embodiment may display various types of content. According to an example embodiment, the electronic apparatus 100 may be implemented as a user terminal device or a TV, but is not limited thereto. For example, when the electronic apparatus 100 is a device having a display function, such as a video wall, a large format display (LFD), a digital signage, a digital information display (DID), a projector display, etc., it may be applicable without limitation. In addition, the electronic apparatus 100 may be implemented in various types of a liquid crystal display (LCD), an organic light-emitting diode (OLED), a liquid crystal on silicon (LCoS), a digital light processing (DLP), a quantum dot (QD) display panel, and a quantum dot light-emitting diodes (QLED), a micro light-emitting diodes (μLEDs), mini LEDs, or the like. Meanwhile, the electronic apparatus 100 may be implemented as a touch screen combined with a touch sensor, a flexible display, a rollable display, a three-dimensional (3D) display, a display in which a plurality of display modules are physically connected, or the like. Hereinafter, for convenience of description, it is assumed that the electronic apparatus 100 is implemented as a TV.

The display 110 according to an example embodiment of the disclosure may be implemented in various types of a liquid crystal display (LCD), an organic light-emitting diode (OLED), a liquid crystal on silicon (LCoS), a digital light processing (DLP), a quantum dot (QD) display panel, and a quantum dot light-emitting diodes (QLED), a micro light-emitting diodes (μLEDs), mini LEDs, or the like. Meanwhile, the display 110 may be implemented as a touch screen combined with a touch sensor, a flexible display, a rollable display, a three-dimensional (3D) display, a display in which a plurality of display modules are physically connected, or the like.

According to an example embodiment, the display 110 may be driven according to a passive driving method (PM) driving method. Here, the PM driving method may refer to a driving method in which two electrodes cross each other vertically and horizontally, and selectively emit light at an intersection point. Here, the intersection point may mean a pixel.

For example, the vertical electrode and the horizontal electrode may be crossed, and an LED element may be provided in each of overlapping portions. A detailed description thereof will be described with reference to FIG. 2.

Figure 2:
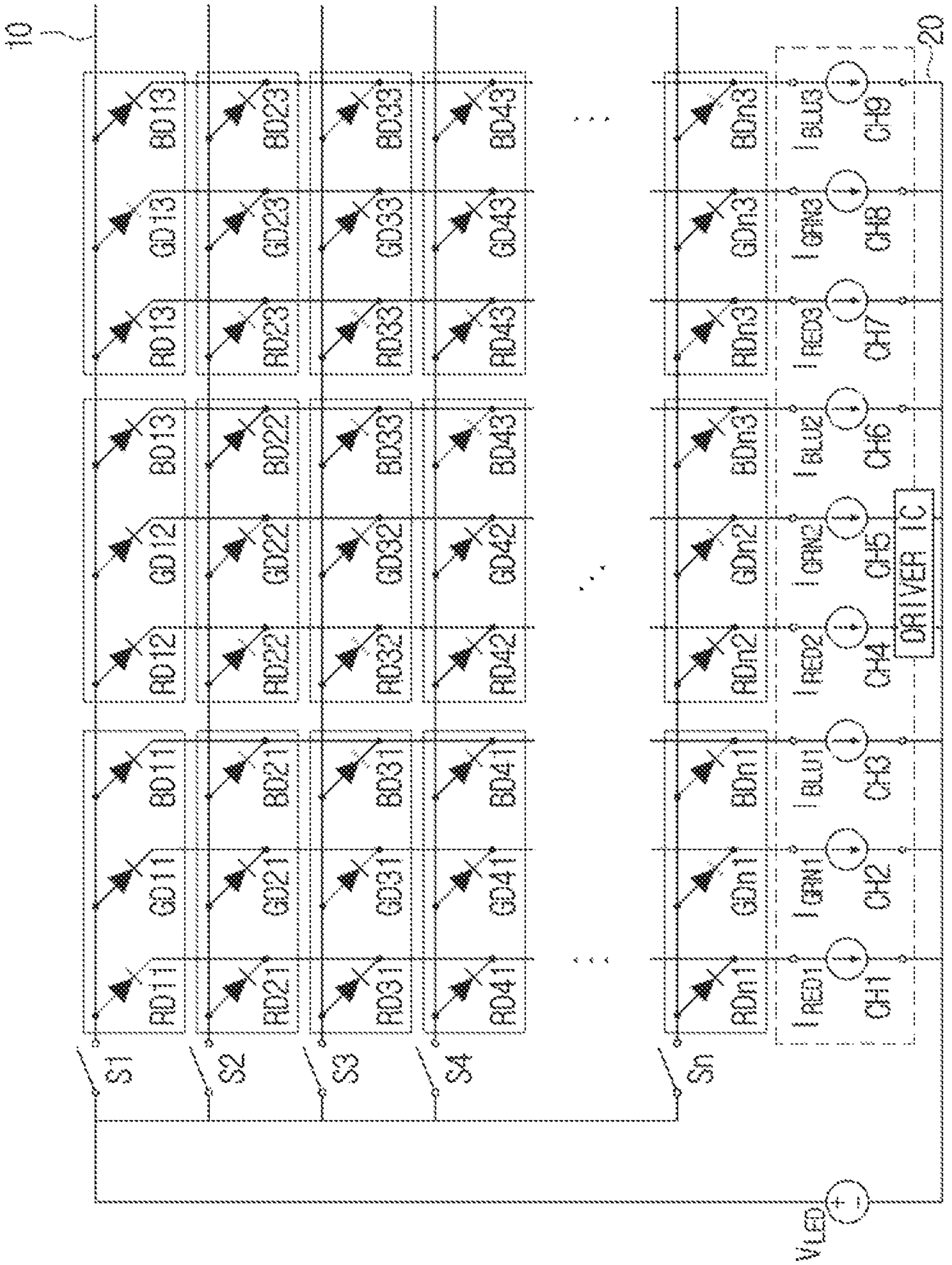
FIG. 2 is a view illustrating a detailed configuration of a display according to an example embodiment.

FIG. 2 is a view illustrating a detailed configuration of a display according to an example embodiment.

Referring to FIGS. 1 and 2, the display 110 may include a plurality of scan lines 10 arranged in one direction, a plurality of data lines 20 arranged in a direction perpendicular to the plurality of scan lines, and a pixel 30 generated at an intersection area of the scan line and the data line.

The display device 100 may be driven according to the PM driving method. In the PM driving method, a current or voltage is progressively applied by crossing a scan line with a horizontal electrode and a data line with a vertical electrode. The one or more processors 120 may progressively provide a scan signal to each scan line. For example, the one or more processors 120 may provide a scan signal to a scan line 1 (S1) and then provide a scan signal to the next line, a scan line 2 (S2). In addition, an LED element to be turned on or turned off may be determined according to whether an image signal is transmitted on the data line. Meanwhile, according to the PM driving method, when there is a voltage difference between the horizontal electrode and the vertical electrode, the corresponding LED element may be turned on, and when there is no voltage difference, the corresponding LED element may be turned off.

Referring to FIG. 2, when data lines of a plurality of scan lines S1 to Sn, that is, a plurality of data lines Ch1 to Ch9 may be connected to one driver IC, and power is progressively supplied to the plurality of scan lines S1 to S, the plurality of scan lines (S1 to Sn) may be referred to as a scan group. The display 110 may include a plurality of scan groups. Specific numbers are examples for convenience of description and are not limited thereto.

Figure 3:
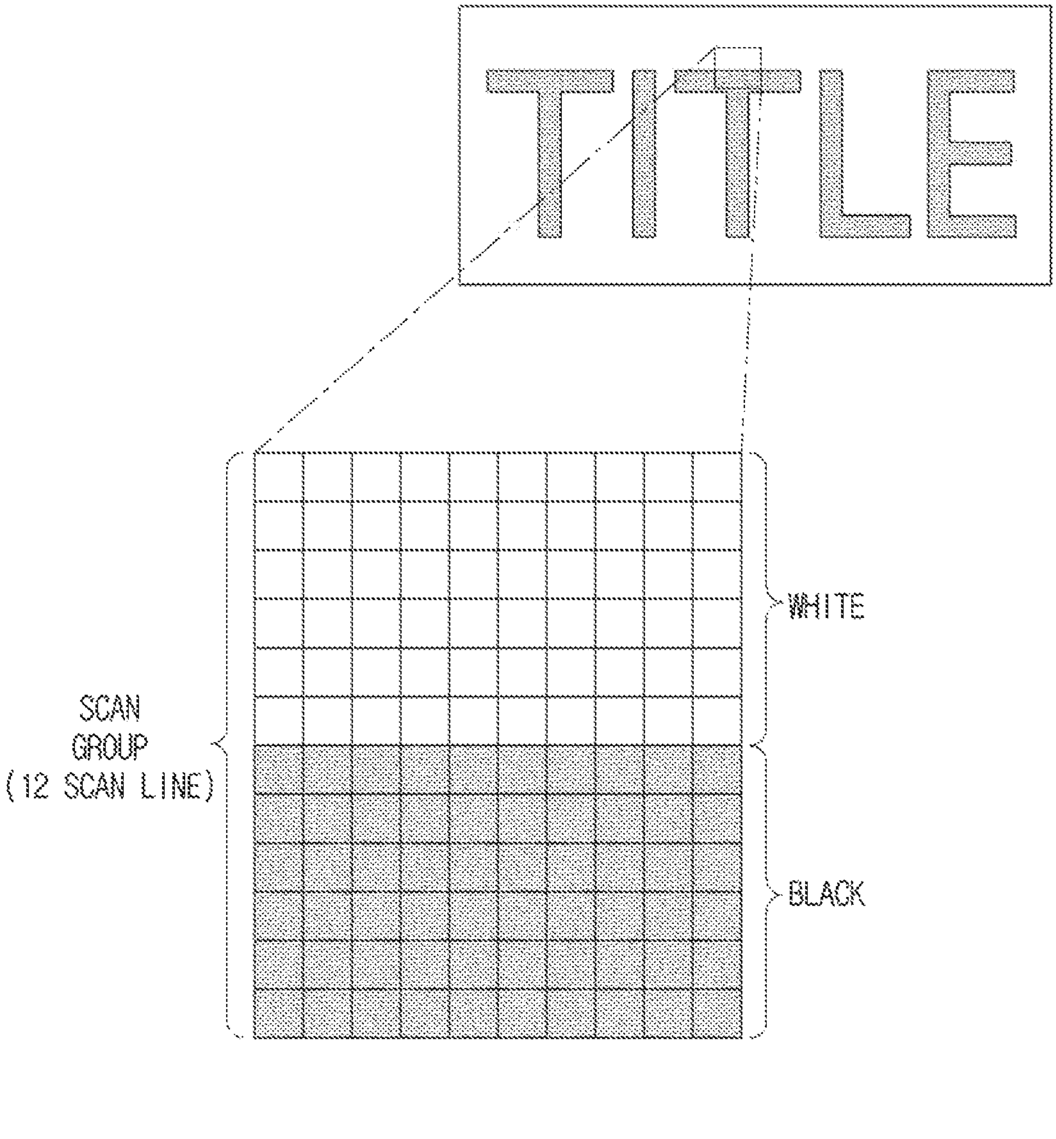
FIG. 3 is a view illustrating a scan group according to an example embodiment.

FIG. 3 is a view illustrating a scan group according to an example embodiment;

According to an example embodiment, one scan group may include n scan lines. Referring to FIG. 3, as an example, a first scan group may include a first scan line S1 to a twelfth scan line S12.

According to an example embodiment, since the display 110 includes a plurality of scan groups, in order for the display 110 to display one image frame, a scan signal may be progressively provided to the first to n-th scan groups S1 to Sn constituting each of the plurality of scan groups under the control of the one or more processors 120, and an image signal may be provided through a data line corresponding to a scan line to which the scan signal is provided is generated.

Meanwhile, since the display 110 according to an example embodiment is driven in the PM driving method and the one or more processors 120 provides scan signals according to a progressive scanning method, the one or more processors 120 may apply a first image signal to the first scan line S1 among the plurality of scan lines in an image frame period, and then apply a second image signal to a second scan line S2 adjacent to the first scan line S1, such that the one or more processors may progressively apply the image signal from the first scan line to n-th scan line included in the scan group.

Returning back to FIG. 2, a method of supplying power through a + pole of an LED element and connecting a − pole to a driver IC to emit light may be referred to as a Common Anode Type. As another example, a method of supplying power through a − pole of an LED element and connecting a + pole to the driver IC to emit light may be referred to as a Common Cathode Type.

The display 110 according to various example embodiments of the disclosure may be implemented as the Common Anode Type, but is not limited thereto, and may be implemented as the Common Cathode Type.

The driver IC shown in FIG. 2 may be implemented as separate hardware controlled by the one or more processors 120 or may be implemented as a single piece of hardware integrated with the one or more processors 120. Hereinafter, for convenience of description, it is assumed that the one or more processors 120 is implemented as a driver IC and one integrated hardware, and the one or more processors 120 provides a scan signal and an image signal.

The display 110 may include a plurality of LED elements. As described above, the display 110 may be implemented as a single panel display or a modular display.

Here, the LED element may be implemented as an RGB LED, and the RGB LED may include a RED LED, a GREEN LED, and a BLUE LED. In addition, the LED element may additionally include a white LED in addition to the RGB LED. According to an example, the LED element may be implemented as a micro LED. Here, a micro LED may be an LED having a size of about 5 to 100 micrometers, and may be a micro-light emitting diode that emits light without a color filter.

Referring back to FIG. 1, the one or more processors 120 may control the overall operation of the electronic apparatus 100.

According to an example embodiment, the one or more processors 120 may be implemented as a digital signal processor (DSP), a microprocessor, or a timing controller (T-CON) that processes a digital image signal. However, it is not limited thereto, and may include one or more of a central processing unit (CPU), microcontroller unit (MCU), micro processing unit (MPU), controller, application processor (AP), or communication processor (CP), ARM processor, or may be defined with a corresponding term. In addition, the processor 120 may be implemented as a system on chip (SoC) or large-scale integration (LSI) with a built-in processing algorithm, or may be implemented in the form of field programmable gate array (FPGA).

According to an example embodiment, the one or more processors 120 may drive each self-luminescence element constituting the display 110, for example, by applying a driving voltage or flowing a driving current to drive the LED element. Here, the one or more processors 120 may control the LED element by progressively applying current or voltage by crossing a scan line with a horizontal electrode and a data line with a vertical electrode.

According to an example embodiment, when the display 110 is implemented in a form including a plurality of LED modules, the one or more processors 120 may include an LED driving module connected to each of the plurality of LED modules, but is not limited thereto, and may include one driving module for controlling a plurality of LED modules. The LED driving module may transmit an image signal received from the one or more processors 120 to a plurality of scan lines connected to the LED driving module to display an image frame corresponding to the image signal on the display screen.

In addition, the LED driving module may output by adjusting a supply time or an intensity of a driving current supplied to the LED element to correspond to the received image signal.

The one or more processors 120 according to an example embodiment may provide scan signals to the plurality of scan lines S1 to Sn in a progressive scanning method during a time period corresponding to an image frame. Also, the one or more processors 120 may provide an image signal corresponding to an image frame to a data line corresponding to a scan line to which a scan signal is provided.

For example, when n scan lines are connected to one driver, that is, the one or more processors 120, a scan signal may be progressively provided from the first scan line S1 to the n-th scan line, and an image signal may be provided to a scan line to which the scan signal is provided. Meanwhile, a period in which all image signals are input from the first scan line to the n-th scan line is referred to as a sub-period, and the sub-period may be repeated a plurality of times to generate one frame. For example, when a frequency of the image signal is 60 hz, a sub-period may be repeated 32 times or 64 times to form one frame. Here, the sub-period may be referred to as a sub-cycle, a sub-frame, or a sub-stage, but hereinafter, for convenience of description, the sub-period is collectively referred to as a sub-period.

Meanwhile, the one or more processors 120 according to the example embodiment may identify whether the image frame is an image in which a first pixel line 1 having high-luminance equal to or greater than a threshold luminance and a second pixel line 2 having low-luminance less than the threshold luminance are alternately arranged.

A detailed description thereof will be described with reference to FIGS. 3 to 5.

Referring to FIG. 3, one scan group including first to n-th scan lines corresponds to one area of an image frame. According to an example embodiment illustrated in FIG. 3, "n" is 12, and as such, one scan group including first to twelfth scan lines corresponds to one area of an image frame. However, the disclosure is not limited thereto, and as such, "n" may be a number different than 12.

One area of the image frame illustrated in FIG. 3 may be an area in which a pixel line having high-luminance equal to or greater than a reference luminance and a pixel line having low-luminance less than the reference luminance are alternately arranged. The reference luminance may be a threshold luminance. For example, pixels included in pixel lines corresponding to first to sixth scan lines S1 to S6 are white, that is, the high-luminance greater than or equal to the threshold luminance. As another example, pixels included in pixel lines corresponding to seventh to twelfth scan lines S7 to S12 are black, that is, the low-luminance less than the threshold luminance. Here, for convenience of description, white and black are examples of a color corresponding to high-luminance and a color corresponding to low-luminance, and of course, are not limited thereto. Here, the pixel line is in the same direction as the scan line, and refers to pixels included in the scan line. According to an example illustrated in FIG. 3, the one area of the image frame has two regions, i.e., a first region in which a pixel line has high-luminance and a second region in which a pixel line has low-luminance. However, the disclosure is not limited thereto, and as such, the one area of the image frame may have more than two regions.

Referring to FIG. 3, when an image frame or one area of the image frame is an image in which the first pixel line 1 having the high-luminance equal to or greater than the threshold luminance and the second pixel line 2 having the low-luminance less than the threshold luminance are alternately arranged, and the one or more processors 120 provides a scan signal according to the progressive scanning method, noise may be generated.

Figure 4:
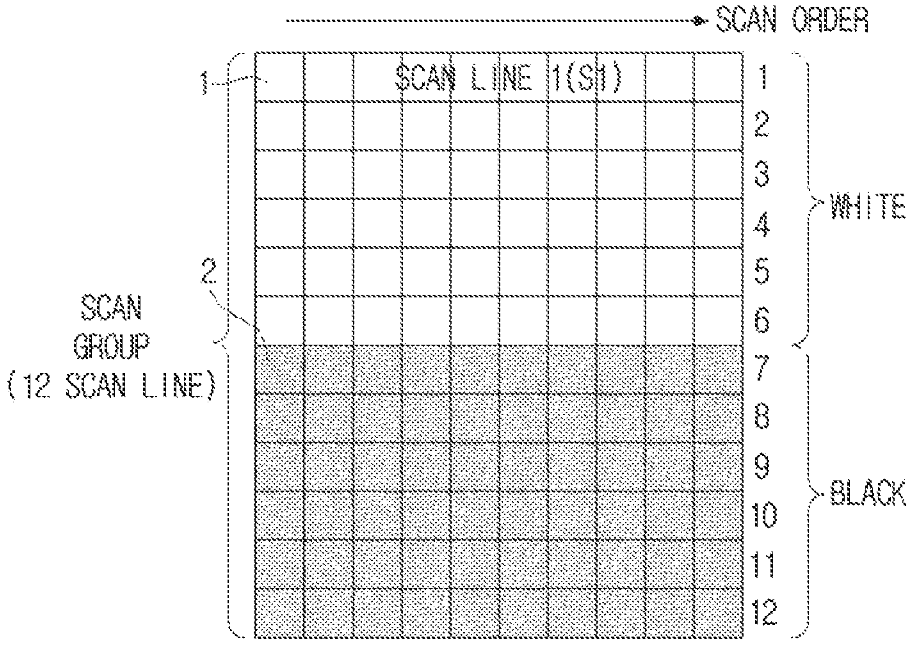
FIG. 4 is a view illustrating a progressive scanning method according to an example embodiment.
Figure 5:
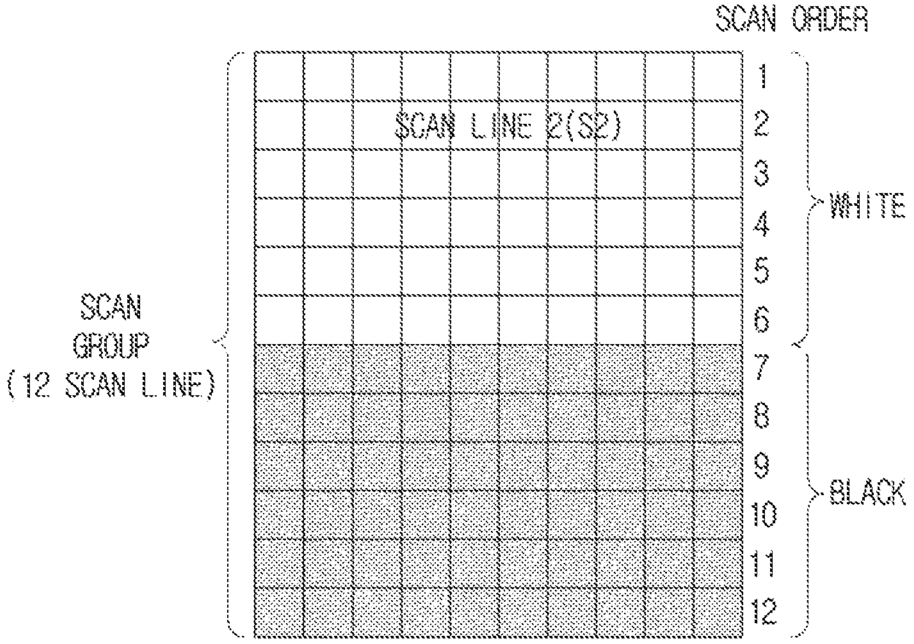
FIG. 5 is a view illustrating a progressive scanning method according to an example embodiment.

FIGS. 4 and 5 are a view illustrating a progressive scanning method according to an example embodiment.

Referring to FIG. 4, the one or more processors 120 may provide a scan signal to a first scan line S1 among first to twelfth scan lines S1 to S12 included in a scan group according to a progressive scanning method, and provide a first image signal by controlling an LED element included in the first scan line S1.

Referring to FIG. 5, the one or more processors 120 may provide a scan signal to a second scan line S2 among first to twelfth scan lines S1 to S12 included in a scan group, and provide a first image signal by controlling an LED element included in the second scan line S2.

Here, each of the first scan lines S1 to S6 may be a first pixel line 1 having high-luminance equal to or greater than a threshold luminance. For example, when an average luminance of pixels constituting the first scan line S1 is equal to or greater than the threshold luminance, or when pixels constituting the first scan line S1 emit light (turn-on) at a certain ratio or more, the one or more processors 120 may identify the first scan line as the first pixel line 1 having high-luminance equal to or greater than the threshold luminance.

As another example, each of the seventh scan line S7 to the twelfth scan line S12 may be the second pixel line 2 having low-luminance less than the threshold luminance. For example, when an average luminance of pixels constituting the seventh scan line S7 is less than the threshold luminance, or when pixels constituting the seventh scan line S7 do not emit light (turn-off) at a certain ratio or more, the one or more processors 120 may identify the seventh scan line as the second pixel line 2 having low-luminance less than the threshold luminance.

Referring to FIGS. 4 and 5, when the one or more processors 120 progressively provides scan signals to the first to twelfth scan lines according to the progressive scanning method and applies an image signal to the scan lines to which the scan signals are provided, a current applied to the display 110 may have a specific waveform. A detailed description thereof will be described with reference to FIG. 6.

Figure 6:
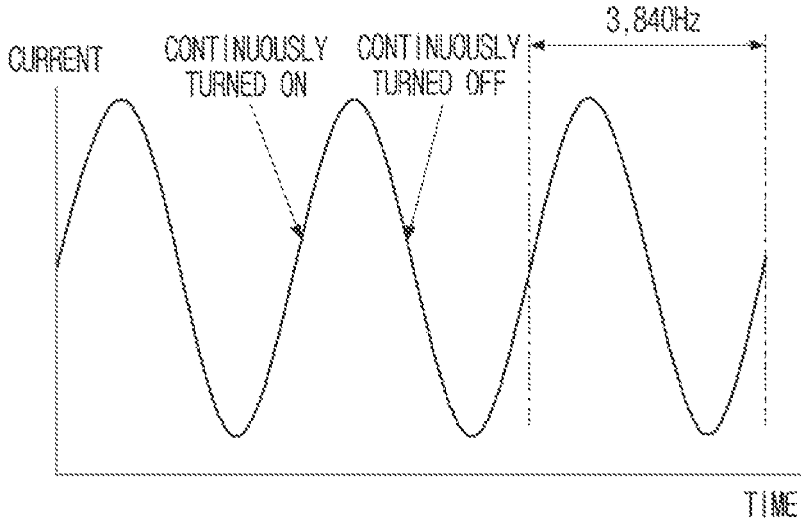
FIG. 6 is a view illustrating a current waveform according to an example embodiment.

FIG. 6 is a view illustrating a current waveform according to an example embodiment;

Referring to FIG. 6, when the first to sixth scan lines S1 to S6 are the first pixel line 1 having high-luminance, while the scan signals are progressively provided to the first to sixth scan lines S1 to S6, LED elements, that are, current applied to the display 110 may gradually increases through a power supply. According to an example embodiment, the power supply may be a switched mode power supply (SMPS).

In addition, if the seventh to twelfth scan lines S7 to S12 are the second pixel line 2 having low-luminance, while the scan signals are progressively provided to the seventh to twelfth scan lines S7 to S12, the current applied to the LED elements through the power supply may be gradually reduced.

According to an example embodiment, a change in an intensity of the current applied by the power supply to the display 110 may have a waveform as shown in a graph of FIG. 6.

If an intensity of the current waveform has an amplitude greater than or equal to a threshold amplitude or has a frequency within an audible frequency (e.g., 20 to 20,000 Hz), there is a problem in that the display 110 outputs acoustic noise while outputting an image frame, resulting in user inconvenience. Here, the threshold amplitude may be changed in various ways depending on installation environment (e.g., indoor, outdoor, etc.) of the electronic apparatus 100, a type of content provided by the electronic apparatus 100 (e.g., moving image, still image, etc.) or user setting.

The one or more processors 120 according to various example embodiments of the disclosure may provide a scan signal to a scan group in an interlaced scanning method instead of the progressive scanning method, when an image frame or one area of the image frame is an image in which the first pixel line 1 having the high-luminance equal to or greater than the threshold luminance and the second pixel line 2 having the low-luminance less than the threshold luminance are alternately arranged.

A detailed description thereof will be described with reference to FIG. 7.

Figure 7:
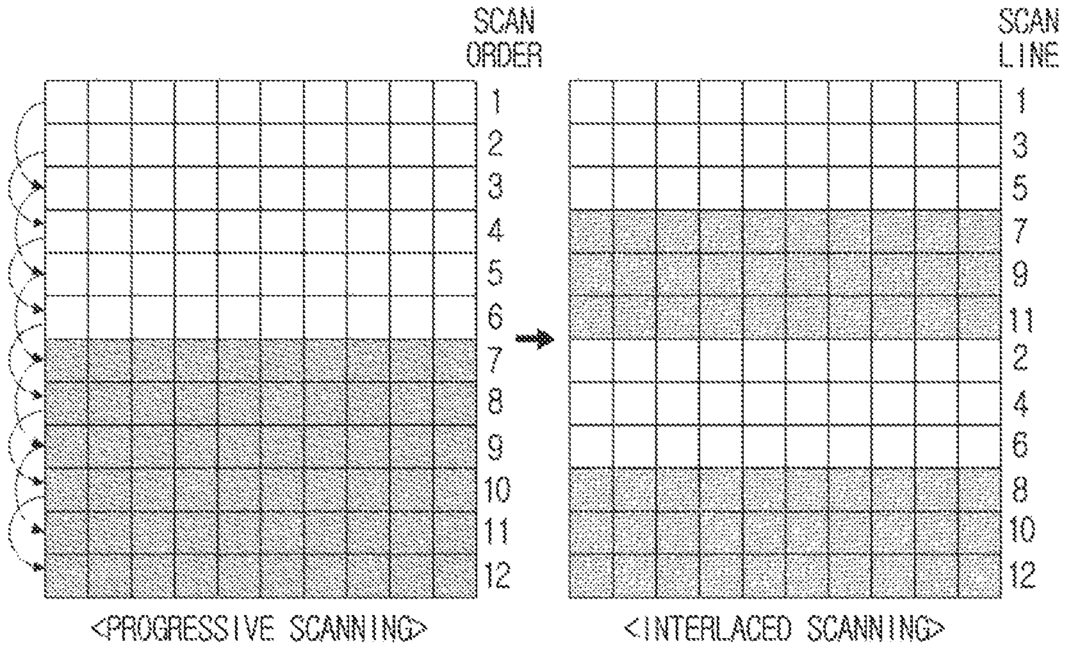
FIG. 7 is a view illustrating an interlaced scanning method according to an example embodiment.

FIG. 7 is a view illustrating an interlaced scanning method according to an example embodiment.

Referring to a left view of FIG. 7, when the one or more processors 120 provides a scan signal in a progressive scanning method, the waveform of the current applied to the display 110 may have an amplitude greater than or equal to the threshold amplitude and a frequency within the audible frequency as shown in the graph shown in FIG. 6.

Accordingly, the one or more processors 120 may provide a scan signal in the interlaced scanning method instead of the progressive scanning method, when an image frame or an area of the image frame corresponding to a scan group is identified as an image in which first pixel line 1 of high-luminance are continuously arranged and second pixel line 2 of low-luminance are continuously arranged, Here, the interlaced scanning method may include all scanning methods such a scanning method in which a scan signal is provided to scan lines by jumping over a predetermined interval or a scanning method in which a scan signal is provided to the scan lines according to a predetermined criterion, except for the method of progressively providing scan signals to scan lines.

For example, the one or more processors 120 may apply a scan signal to at least one of a plurality of scan lines corresponding to the second pixel line 2 after applying the scan signal to at least one of the plurality of scan lines corresponding to the first pixel line 2 included in the scan group.

Meanwhile, a meaning of an image in which the first pixel lines 1 of high-luminance are continuously arranged in an area of an image frame or an image frame corresponding to a scan group, and second pixel lines 2 of low-luminance are continuously arranged may refer an image in which the first pixel line 1 and the second pixel line 2 have a specific arrangement pattern. Here, the specific pattern may include a stripe pattern in a same direction as the scan line.

Since the one or more processors 120 applies the scan signal and the image signal to the first pixel line 1 of high-luminance and then applies the scan signal and the image signal to the second pixel line 2 of low-luminance, the intensity of the current waveform may not have an amplitude above the threshold amplitude. In this case, even when the frequency of the waveform is within an audible frequency, since the intensity of the current waveform is not above the threshold amplitude, the user does not recognize the acoustic noise. As such, the user does not feel discomfort or unpleasant.

As another example, the one or more processors 120 may determine the number of scan lines to which scan signals are continuously applied among scan lines corresponding to the first pixel line 1 based on the number of scan lines corresponding to the first pixel line 1 of high-luminance and the number of scan lines corresponding to the second pixel line 2 of low-luminance in the scan group.

As the scan signal and the image signal are progressively or continuously applied to the scan lines corresponding to the first pixel line 1 having high-luminance in the scan group, the intensity of the current applied to the display 110 may increase.

According to an exemplary example embodiment, the one or more processors 120 may progressively apply the scan signal to some of the scan lines corresponding to the second pixel line 2 after progressively applying the scan signal to some of the scan lines corresponding to the first pixel line 1, such that the intensity of the current waveform does not have an amplitude greater than or equal to the threshold amplitude even when a scan signal is progressively applied to the scan lines corresponding to the first pixel line 1 of high-luminance, based on the number of scan lines corresponding to the first pixel line 1 and the number of scan lines corresponding to the second pixel line 2 in the scan group.

For example, referring to FIG. 7, the one or more processors 120 may progressively apply a scan signal to the seventh to ninth scan lines among the seventh to twelfth scan lines corresponding to the second pixel line 2 after progressively applying the scan signal to the first to third scan lines among the first to sixth scan lines corresponding to the first pixel line 1.

Subsequently, the one or more processors 120 may progressively apply a scan signal to the seventh to twelfth scan lines to which a scan signal is not applied among the seventh to twelfth scan lines corresponding to the second pixel line 2 after progressively applying the scan signal to the fourth to sixth scan lines to which a scan signal is not applied among the first to sixth scan lines corresponding to the first pixel line 1. Accordingly, the intensity of the current waveform applied to the display 110 may have an amplitude less than a threshold amplitude or a frequency exceeding an audible frequency, and acoustic noise may not occur.

As another example, the one or more processors 120 may determine a separation distance between scan lines to which scan signals are continuously applied in the interlaced method based on the number of scan lines corresponding to the first pixel line 1 of high-luminance and the number of scan lines corresponding to the second pixel line 2 of low-luminance in the scan group.

For example, the one or more processors 120 may provide a scan signal to scan lines spaced apart by first scan line as shown in FIG. 7. The one or more processors 120 may provide a scan signal to the first, third, fifth, seventh, ninth, eleventh scan lines in a method of providing a scan line to the third scan line (S3) after providing the scan line to the first scan line (S1). Subsequently, the one or more processors 120 may progressively provide scan signals to the second, fourth, sixth, eighth, and twelfth scan lines. Hereinafter, for convenience of description, a distance between scan lines to which scan signals are continuously applied in the interlaced scanning method will be referred to as a Scan Line Order No.

Even when an area of the image frame has a stripe pattern as shown on the left view of FIG. 7, when a scan signal is provided according to the interlaced scanning method (Scan Line Order 1) instead of the progressive scanning method, a scan signal having the stripe pattern as shown on the right view of FIG. 7 may be provided.

Both the left and right views of FIG. 7 are stripe patterns, but since the scan signal is provided by appropriately crossing the scan line corresponding to the first pixel line and the scan line corresponding to the second pixel line, a change in the intensity of the current may have a waveform that is less than the threshold amplitude or exceeds the audible frequency. For example, the one or more processors 120 may provide a scan signal to a plurality of scan lines to form an irregular stripe pattern.

The intensity of the current waveform according to the change from the progressive scanning method to the interlaced scanning method will be described with reference to FIG. 8.

Figure 8:
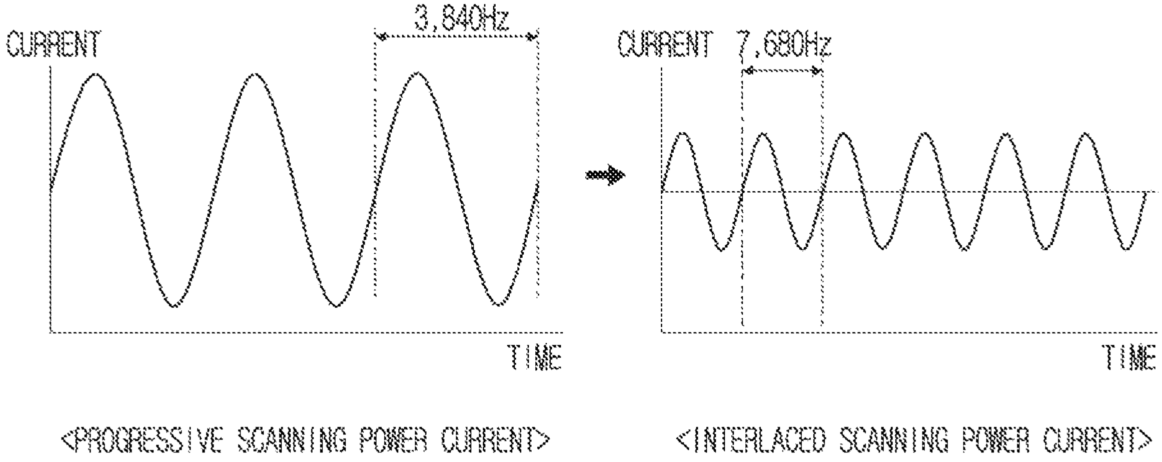
FIG. 8 is a view illustrating a current waveform according to an example embodiment.

FIG. 8 is a view illustrating a current waveform according to an example embodiment;

A graph on the left of FIG. 8 indicates an intensity of a current waveform when the one or more processors 120 provides a scan signal in a progressive method, when an image frame corresponding to a scan group or an area of the image frame is as shown in FIGS. 3 to 5.

A graph on the right of FIG. 8 indicates an intensity of a current waveform when the one or more processors 120 provides a scan signal in an interlaced scanning method (Scan Line Order 1), when an image frame corresponding to a scan group or an area of the image frame is as shown in FIGS. 3 to 5. Referring to the graph on the right of FIG. 8, since the intensity of the current waveform has an amplitude less than a threshold amplitude, the user may not recognize acoustic noise even if it has a frequency within an audible frequency (e.g., 7,680 Hz). Accordingly, the user convenience may be improved.

In the example embodiment described above, when the display 110 is driven in a progressive driving method, and when an image frame is identified as an image in which the first pixel line 1 of high-luminance and the second pixel line 2 of low-luminance are alternately arranged, the interlace scanning method is driven, but the reverse is also possible. A detailed description thereof will be described with reference to FIG. 9.

Figure 9:
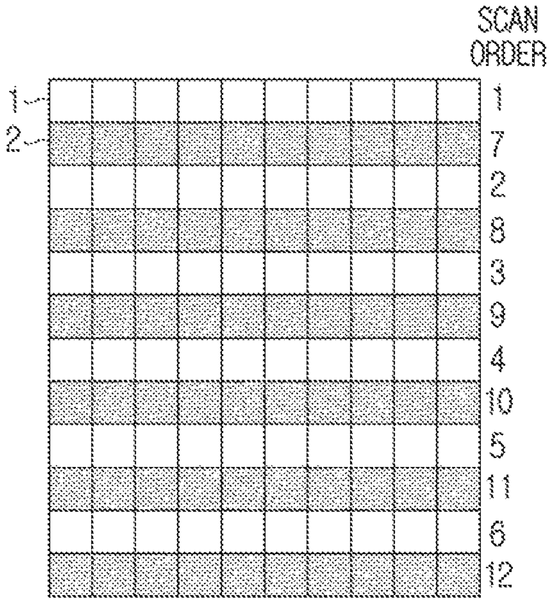
FIG. 9 is a view illustrating an image frame according to an example embodiment.

FIG. 9 is a view illustrating an image frame according to an example embodiment.

Referring to FIG. 9, the one or more processors 120 may provide a scan signal to a plurality of scan lines 10 when an image frame is an image in which the first pixel line 1 having high-luminance equal to or greater than the threshold luminance and the second pixel line 2 having low-luminance less than the threshold luminance are alternately arranged at an interval of first scan line.

For example, as shown in FIG. 9, when the one or more processors 120 provides a scan signal to the plurality of scan lines 10 in an interlaced scanning method (Scan Line Order 1), in an image frame or scan group in which the first pixel line 1 and the second pixel line 2 are alternately arranged one by one, a scan signal and an image signal may be applied as in the case of having the stripe pattern as shown in FIGS. 3 to 5.

Accordingly, an intensity of a current waveform applied to the display device 100 may be greater than or equal to the threshold amplitude as shown in the graph of FIG. 6 and may be within the audible frequency.

According to an example embodiment, the one or more processors 120 may identify whether to change the scanning method based on a scanning method (e.g., progressive scanning method or interlaced scanning method) of a scan signal and a specific pattern included in an image frame.

For example, when a scanning method of a scan signal is a progressive scanning method, and an image frame or an area of the image frame corresponding to a scan group includes a stripe pattern in which the first pixel line of high-luminance 1 and the second pixel line of low-luminance are alternately arranged at an interval of n (e.g., 4 or more) scan lines, the one or more processors 120 may change the scanning method of the scan signal to the interlaced scanning method.

As another example, when the interlaced scanning method (Scan Line Order 1) of a scan signal is a progressive scanning method, and an image frame or an area of the image frame corresponding to a scan group includes a stripe pattern in which the first pixel line of high-luminance 1 and the second pixel line of low-luminance are alternately arranged at a scan line interval, the one or more processors 120 may change the scanning method of the scan signal to the progressive scanning method.

As another example, when the one or more processors 120 provides scan signals to scan lines according to a currently determined scanning method, when it is identified that a scan signal is continuously provided to the scan lines corresponding to the first pixel line 1 of high-luminance or the scan lines corresponding to the second pixel line 2 of low-luminance, a scan signal may be provided after changing the scanning method.

Figure 10:
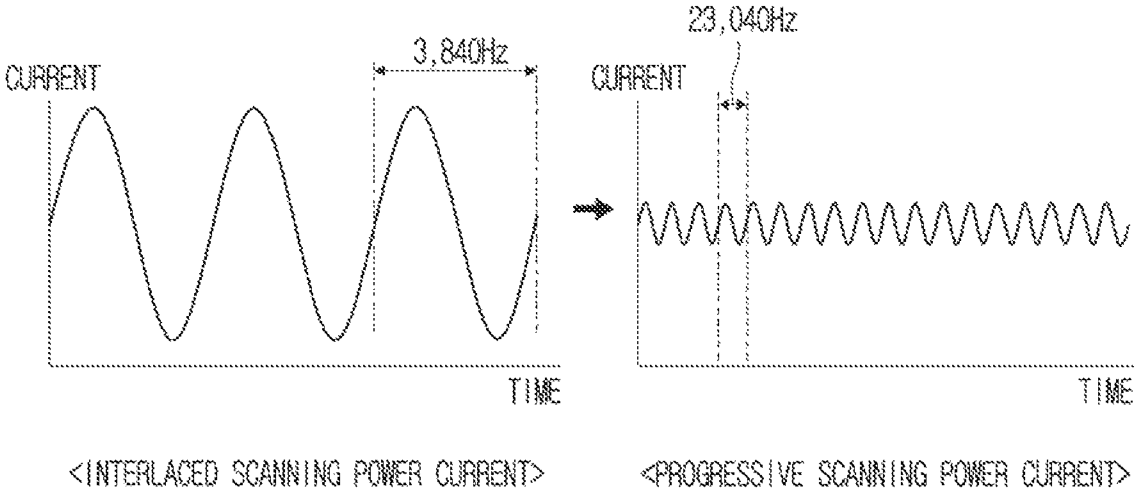
FIG. 10 is a view illustrating a current waveform according to another example embodiment.

FIG. 10 is a view illustrating a current waveform according to another example embodiment.

When an image frame including the stripe pattern as shown in FIG. 9 is displayed in the interlaced scanning method (Scan Line Order 1), the intensity of the current waveform applied to the display 110 may have the same waveform as the left view of FIG. 10.

Accordingly, in order to prevent an occurrence of acoustic noise, the one or more processors 120 may display the image frame including the stripe pattern as shown in FIG. 9 in a progressive scanning method as described above, and the intensity of the current waveform applied to the display 110 may have a waveform as shown in the right view of FIG. 10.

As another example, the one or more processors 120 may display the interlaced scanning method (Scan Line Order 2) instead of the progressive scanning method. For example, when the one or more processors 120 provides a scan signal in the interlaced scanning method (Scan Line Order 2), a scan signal may be provided in an order of first scan line (first pixel line)→fourth scan line (second pixel line)→seventh scan line (first pixel line)→tenth scan line (second pixel line)→second scan line (second pixel line)→fifth scan line (first pixel line)→eighth scan line (second pixel line)→eleventh scan line (first pixel line)→third scan line (first pixel line)→sixth scan line (second pixel line)→ninth scan line (first pixel line)→twelfth scan line (second pixel line), and the scan signal may not be continuously provided to the first pixel line or the second pixel line more than a predetermined number of times. In this case, since the intensity of the current waveform is less than a threshold amplitude or exceeds an audible frequency (e.g., 23,040 Hz), the user does not recognize acoustic noise, such that the user convenience may be increased.

Figure 11:
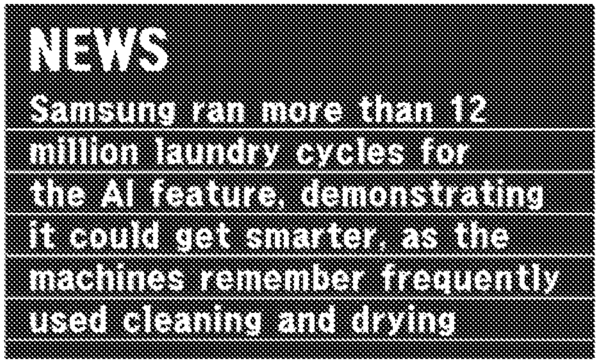
FIG. 11 is a view illustrating an image frame according to an example embodiment.

FIG. 11 is a view illustrating an image frame according to an example embodiment.

In the example embodiment described above, the waveform of the current has been described assuming one scan group for convenience of description, but the disclosure is not limited thereto.

For example, as shown in FIG. 3, one scan group may correspond to one area of an image frame, and the display 110 may include a plurality of scan groups.

The display 110 according to an example embodiment may be composed of a plurality of display modules, and each of the plurality of display modules may include a plurality of scan lines arranged in one direction, a plurality of data lines arranged in a direction perpendicular to the plurality of scan lines, and a pixel generated at an intersection area of the scan line and the data line.

The one or more processors 120 according to the example embodiment may identify whether the image frame is an image in which a first pixel line having high-luminance equal to or greater than a threshold luminance and a second pixel line having low-luminance less than the threshold luminance are alternately arranged.

For example, when an image frame provided through a plurality of display modules is identified as an image including a stripe pattern in the same direction as a scan line, the one or more processors 120 may provide a scan signal to a plurality of scan lines included in each of the plurality of display modules in the interlaced scanning method.

For example, the one or more processors 120 may provide the scan signal to the plurality of scan lines included in each of the plurality of display modules from the progressive scanning method to the interlaced scanning method, or may change Scan Line Order No. in the interlaced scanning method. Accordingly, provision of acoustic noise to the user may be prevented since the intensity of the current waveform applied to the display 110 is less than the threshold amplitude or exceeds the audible frequency.

Figure 12:
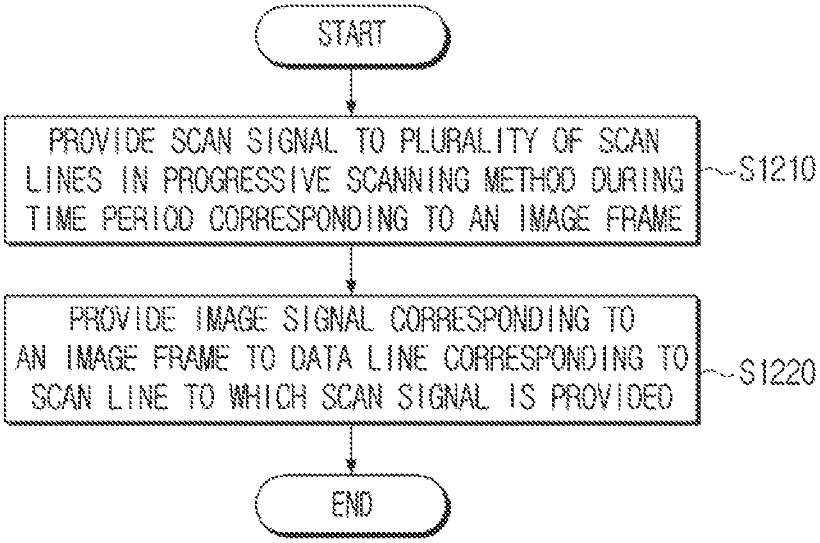
FIG. 12 is a flowchart illustrating a method of controlling an electronic apparatus according to an example embodiment.

FIG. 12 is a flowchart illustrating a method of controlling an electronic apparatus according to an example embodiment.

A method of controlling an electronic apparatus including a display including a plurality of scan lines arranged in one direction, a plurality of data lines arranged in a direction perpendicular to the plurality of scan lines, and pixels generated in an intersection area of the scan line and the data line may provide a scan signal to the plurality of scan lines in a progressive scanning method during a time period corresponding to an image frame (S1210).

Also, an image signal corresponding to an image frame may be provided to a data line corresponding to a scan line to which a scan signal is provided (S1220).

Here, the operation S1210 of providing the scan signal may further include providing a scan signal to the plurality of scan lines in the interlaced scanning method, when the image frame is an image in which a first pixel line having high-luminance equal to or greater than a threshold luminance and a second pixel line having low-luminance less than the threshold luminance are alternately arranged, and the first pixel line and the second pixel line may be in the same direction as the scan line.

Here, the operation of providing the scan signal in the interlaced scanning method may include applying the scan signal to at least one of the scan lines corresponding to the plurality of second pixel lines after applying the scan signal to at least one of the scan lines corresponding to the plurality of first pixel lines, when an image frame is an image in which a plurality of second pixel line having low-luminance are continuously arranged after a plurality of first pixel lines having high-luminance are arranged.

The control method according to an example embodiment may further include determining the number of scan lines to which scan signals are continuously applied among scan lines corresponding to the first pixel line based on the number of first pixel lines and the number of second pixel line.

The control method according to an example embodiment may further include determining a separation distance between scan lines to which scan signals are continuously applied in an interlaced scanning method based on the number of first pixel lines and the number of second pixel line.

The control method according to an example embodiment may further include providing a current of a waveform having an amplitude less than a threshold amplitude or a frequency exceeding an audible frequency to the display by providing the scan signal in the interlaced scanning method.

An image frame according to an example embodiment may include a stripe pattern in which first pixel lines having high-luminance and second pixel line having low-luminance are alternately arranged.

The control method according to an example embodiment may further include identifying the pixel line as the first pixel line when an average luminance of pixels included in the pixel line in the same direction as the scan line is equal to or greater than a threshold luminance, and identifying the pixel line as the second pixel line when the average luminance of the pixels included in the pixel line is less than the threshold luminance.

The display according to an example embodiment may be composed of a display modules, and each of the plurality of display modules may include a plurality of scan lines arranged in one direction, a plurality of data lines arranged in a direction perpendicular to the plurality of scan lines, pixels generated in an intersection area of the scan line and the data line, and the providing the scan signal in the interlaced scanning method may include providing a scan signal to the plurality of scan lines included in each of the plurality of display modules in the interlaced scanning method, when the image frame is an image in which a first pixel line having high-luminance equal to or greater than the threshold luminance and a second pixel line having low-luminance less than the threshold luminance are alternately arranged.

Here, the pixel may be a light emitting diode (LED) pixel.

However, various example embodiments of the disclosure may be applied to all types of electronic apparatuses including displays as well as electronic apparatuses.

In addition, according to an example embodiment, various example embodiments described above may be implemented in a recording media that may be read by a computer or a similar device to the computer by suing software, hardware, or a combination thereof. In some cases, the example embodiments described herein may be implemented by the processor itself. In a software configuration, various example embodiments described in the specification such as a procedure and a function may be implemented as separate software modules. The software modules may respectively perform one or more functions and operations described in the disclosure According to various example embodiments described above, computer instructions for performing processing operations of a device according to the various example embodiments described above may be stored in a non-transitory computer-readable medium. The computer instructions stored in the non-transitory computer-readable medium may cause a particular device to perform processing operations on the device according to the various example embodiments described above when executed by the processor of the particular device.

The non-transitory computer-readable medium does not refer to a medium that stores data for a short period of time, such as a register, cache, memory, etc., but semi-permanently stores data and is available of reading by the device. For example, the non-transitory computer-readable medium may be CD, DVD, a hard disc, Blu-ray disc, USB, a memory card, ROM, or the like.

The foregoing exemplary example embodiments and advantages are merely exemplary and are not to be construed as limiting the disclosure. The present teaching can be readily applied to other types of apparatuses. Also, the description of the exemplary example embodiments is intended to be illustrative, and not to limit the scope of the claims, and many alternatives, modifications, and variations will be apparent to those skilled in the art.

What is claimed is:

1. An electronic apparatus comprising:

a display including a plurality of scan lines arranged in a first direction, a plurality of data lines arranged in a second direction perpendicular to the first direction, and a plurality of pixels, each of the plurality of pixels being located an intersection of one of the plurality of scan lines and one of the plurality of data lines; and one or more processors configured to:

provide a scan signal to the plurality of scan lines based on a progressive scanning method during a time period corresponding to an image frame, and provide an image signal corresponding to the image frame to a data line corresponding to a scan line, among the plurality of scan lines, to which the scan signal is provided, and change from the progressive scanning method to an interlaced scanning method based on identifying that the image frame includes a first pixel line having a first luminance greater than or equal to a reference luminance and a second pixel line having a second luminance less than the reference luminance are alternately arranged, and after changing from the progressive scanning method to the interlaced scanning method, to provide the scan signal to the plurality of scan lines in the interlaced scanning method to provide a current to the display in a waveform having a frequency in the audible frequency range and having an amplitude less than a threshold amplitude, wherein the first pixel line and the second pixel line are in a same direction as the scan line, and wherein the one or more processors is further configured to vary the threshold amplitude based on at least one of an installation environment of the electronic apparatus, a type of content provided by the electronic apparatus or user setting.

2. The electronic apparatus of claim 1, wherein the one or more processors is further configured to, based on the first pixel line including a plurality of continuously arranged pixel lines having the first luminance are and the second pixel line having a plurality of continuously arranged pixel lines having the second luminance, apply the scan signal to at least one of the scan lines corresponding to the first pixel line and apply the scan signal to at least one of the scan lines corresponding the second pixel line.

3. The electronic apparatus of claim 1, wherein the one or more processors is configured to determine a number of scan lines to which the scan signal is continuously applied among the scan lines corresponding to the first pixel line based on a number of scan lines corresponding to the first pixel line and a number of scan lines corresponding to the second pixel line.

4. The electronic apparatus of claim 1, wherein the one or more processors is configured to determine a separation distance between scan lines to which the scan signal is continuously applied in the interlaced scanning method based on a number of scan lines corresponding to the first pixel line and a number of scan lines corresponding to the second pixel line.

5. The electronic apparatus of claim 2, wherein the image frame is configured to include a stripe pattern in which the first pixel line having the first luminance and the second pixel line having the second luminance are alternately arranged.

6. The electronic apparatus of claim 1, wherein the one or more processors is configured to identify a pixel line in a same direction as the scan line and having an average luminance of pixels greater than or equal to the reference luminance as the first pixel line, and identify a pixel line in a same direction as the scan line and having an average luminance of pixels less than the reference luminance as the second pixel line.

7. The electronic apparatus of claim 1, wherein the display is configured to be composed of a plurality of display modules, and each of the plurality of display modules is configured to include the plurality of scan lines arranged in the first direction, the plurality of data lines arranged in the second direction, and the pixel provided at each intersection area of the plurality of scan lines and the plurality of data lines, wherein the one or more processors is configured to, based on the image frame including the first pixel line having the first luminance greater than or equal to the reference luminance and the second pixel line having the second luminance less than the reference luminance are alternately arranged, provide the scan signal to the plurality of scan lines included in each of the plurality of display modules in the interlaced scanning method.

8. The electronic apparatus of claim 7, wherein the pixel is a light emitting diode (LED) pixel.

9. The electronic apparatus of claim 1, wherein the one or more processors is further configured to:

determine a number of adjacent scan lines to which the scan signal is continuously applied among the scan lines corresponding to the first pixel line, and based on the number of scan lines to which the scan signal is continuously applied being greater than a reference number, provide the scan signal to the plurality of scan lines in the interlaced scanning method.

10. The electronic apparatus of claim 1, wherein the threshold amplitude is a first amount based on the electronic apparatus being in a first location, and the threshold amplitude is a second amount based on the electronic apparatus being in a second location.

11. A method of controlling an electronic apparatus comprising a plurality of scan lines arranged in a first direction, a plurality of data lines arranged in a second direction perpendicular to the first direction, and a plurality of pixels, each of the plurality of pixels being located an intersection of one of the plurality of scan lines and one of the plurality of data lines, the method comprising:

providing a scan signal to the plurality of scan lines based on a progressive scanning method during a time period corresponding to an image frame; and providing an image signal corresponding to the image frame to a data line corresponding to a scan line, among the plurality of scan lines, to which the scan signal is provided;

changing from the progressive scanning method to an interlaced scanning method based on identifying that the image frame includes a first pixel line having a first luminance greater than or equal to a reference luminance and a second pixel line having a second luminance less than the reference luminance are alternately arranged;

after changing from the progressive scanning method to the interlaced scanning method, providing the scan signal to the plurality of scan lines in the interlaced scanning method to provide a current to the display in a waveform having a frequency in the audible frequency range and having an amplitude less than a threshold amplitude, wherein the first pixel line and the second pixel line are in a same direction as the scan line, and wherein the threshold amplitude is varied based on at least one of an installation environment of the electronic apparatus, a type of content provided by the electronic apparatus or user setting.

12. The method of claim 11, wherein the providing the scan signal in the interlaced scanning method comprises, based on the first pixel line including a plurality of continuously arranged pixel lines having the first luminance are and the second pixel line having a plurality of continuously arranged pixel lines having the second luminance, applying the scan signal to at least one of the scan lines corresponding to the first pixel line and applying the scan signal to at least one of the scan lines corresponding the second pixel line.

13. The method of claim 11, further comprising:

determining a number of scan lines to which the scan signal is continuously applied among the scan lines corresponding to the first pixel line based on a number of scan lines corresponding to the first pixel line and a number of scan lines corresponding to the second pixel line.

14. The method of claim 11, further comprising:

determining a separation distance between scan lines to which the scan signal is continuously applied in the interlaced scanning method based on a number of scan lines corresponding to the first pixel line and a number of scan lines corresponding to the second pixel line.

15. The method of claim 11, wherein the image frame is configured to include a stripe pattern in which the first pixel line having the first luminance and the second pixel line having the second luminance are alternately arranged.

* * * * *